United States Patent
Iwano et al.

(10) Patent No.: US 9,931,850 B2
(45) Date of Patent: Apr. 3, 2018

(54) MANUFACTURE METHOD OF LIQUID SUPPLY MEMBER, MANUFACTURE APPARATUS, AND LIQUID SUPPLY MEMBER

(71) Applicant: CANON KABUSHIKI KAISHA, Tokyo (JP)

(72) Inventors: Takuya Iwano, Inagi (JP); Yukuo Yamaguchi, Tokyo (JP); Mikiya Umeyama, Tokyo (JP); Satoshi Oikawa, Yokohama (JP); Hiromasa Amma, Kawasaki (JP); Satoshi Kimura, Kawasaki (JP); Naoko Tsujiuchi, Kawasaki (JP); Yasushi Iijima, Tokyo (JP); Kyosuke Toda, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/156,649

(22) Filed: May 17, 2016

(65) Prior Publication Data
US 2016/0347072 A1    Dec. 1, 2016

(30) Foreign Application Priority Data

May 25, 2015  (JP) .................................. 2015-105174
Mar. 25, 2016 (JP) .................................. 2016-061825

(51) Int. Cl.
*B41J 2/175* (2006.01)
*B29C 45/16* (2006.01)
(Continued)

(52) U.S. Cl.
CPC ............ *B41J 2/175* (2013.01); *B29C 45/0062* (2013.01); *B41J 2/1752* (2013.01); *B29L 2031/767* (2013.01)

(58) Field of Classification Search
CPC .......... B29C 2045/0063; B29C 45/006; B29D 35/082; B29D 35/084
See application file for complete search history.

(56) References Cited

U.S. PATENT DOCUMENTS 4,302,416 A * 11/1981 Rudolf ................. B29D 35/084
                                                  264/244
5,334,039 A *  8/1994 Kanda ................ H01R 13/5219
                                                  264/135
(Continued)

FOREIGN PATENT DOCUMENTS

JP       2002-178538 A    6/2002

OTHER PUBLICATIONS

Amma et al., U.S. Appl. No. 15/156,583, filed May 17, 2016.
(Continued)

*Primary Examiner* — Stephen Meier
*Assistant Examiner* — John P Zimmermann
(74) *Attorney, Agent, or Firm* — Fitzpatrick, Cella, Harper & Scinto

(57) ABSTRACT

A housing and a cover member are injection-molded and these housing and cover member are joined within a pair of mold. When the housing and the cover member are joined by molten resin, a mold for suppressing deformation is positioned at a face of the housing opposite to a face receiving a pressure of the molten resin.

10 Claims, 14 Drawing Sheets

(51) Int. Cl.
    *B29C 45/00*     (2006.01)
    *B29L 31/00*     (2006.01)

(56) References Cited

U.S. PATENT DOCUMENTS

| | | | |
|---|---|---|---|
| 6,206,681 B1* | 3/2001 | Kawase | B29C 45/006 |
| | | | 264/238 |
| 8,201,923 B2* | 6/2012 | Fujii | B41J 2/14024 |
| | | | 347/47 |
| 8,616,876 B2* | 12/2013 | Moulin | B29C 45/006 |
| | | | 264/255 |
| 2006/0109319 A1* | 5/2006 | Momose | B41J 2/14274 |
| | | | 347/71 |
| 2009/0202884 A1* | 8/2009 | Morimoto | B29C 45/14336 |
| | | | 429/494 |
| 2010/0245474 A1* | 9/2010 | Okubo | B29C 70/80 |
| | | | 347/44 |

OTHER PUBLICATIONS

Oikawa et al., U.S. Appl. No. 15/151,880, filed May 11, 2016.
Tsujiuchi et al., U.S. Appl. No. 15/157,909, filed May 18, 2016.
Iwano et al., U.S. Appl. No. 15/156,578, filed May 17, 2016.
Kimura et al., U.S. Appl. No. 15/156,569, filed May 17, 2016.
Oikawa et al., U.S. Appl. No. 15/157,890, filed May 18, 2016.
Toda et al., U.S. Appl. No. 15/156,559, filed May 17, 2016.

\* cited by examiner

MANUFACTURE METHOD OF LIQUID SUPPLY MEMBER, MANUFACTURE APPARATUS, AND LIQUID SUPPLY MEMBER

BACKGROUND OF THE INVENTION

Field of the Invention

The present invention relates to a manufacture method of a liquid supply member including therein a liquid supply path, a manufacture apparatus, and a liquid supply member.

Description of the Related Art

This type of liquid supply member is provided, for example, in a liquid ejection head that can eject liquid, supplied from a liquid container, from an ejection portion. The liquid supply member includes therein a liquid supply path between the liquid container and the ejection portion. The liquid ejection head may be an inkjet print head that can eject ink supplied from an ink tank (liquid container) through a plurality of ejection openings (ejection portion). A print head that can eject a plurality of types of inks includes an ink supply member (liquid supply member) including a plurality of ink supply paths (liquid supply paths) corresponding to the respective inks and these ink flow paths are formed to be bent.

Generally, the liquid supply member having such a liquid supply path as described above are configured, from the viewpoint of easy manufacturing, light weight, and corrosion resistance, by the combination of a plurality of components obtained by subjecting resin material to injection molding. For example, the plurality of components are individually injection-molded and are subsequently assembled by the adhesion by ultrasonic welding or adhesive material for example.

However, when the plurality of components individually subjected to injection molding are assembled by welding or adhesion for example, the dimensional accuracy among the plurality of components may be compromised. The reason is that the dimensional accuracy of the liquid supply members after the assembly is influenced by the molding accuracy and joint accuracy of these components for example.

SUMMARY OF THE INVENTION

The present invention provides a manufacture method, a manufacture apparatus, and a liquid supply member by which a liquid supply member having a high dimensional accuracy can be manufactured while securing the shape of a liquid supply path suitable for stable liquid supply.

In the first aspect if the present invention, there is provided a manufacture method of a liquid supply member in which a first constituting component and a second constituting component have therebetween a liquid supply path, comprising:

a first step of injection-molding the first constituting component at a first position between a pair of molds and injection-molding the second constituting component at a second position between the pair of molds;

a second step of opening the pair of molds so that one of the pair of molds has the first constituting component and the other of the mold has the second constituting component and subsequently moving the pair of molds relative to each other so that the first constituting component is opposed to the second constituting component;

a third step of closing the pair of molds so that the first constituting component is abutted to the second constituting component; and a fourth step of allowing molten resin to flow to an abutted part of the first constituting component and the second constituting component, wherein:

at least one of the first and second constituting components includes a reduced thickness portion receiving a pressure of the molten resin in the fourth step, and in a case where the pair of molds are closed by the third step, a mold for suppressing deformation is positioned at a face opposite to a face receiving the pressure of the reduced thickness portion.

In the second aspect if the present invention, there is provided a manufacture apparatus of a liquid supply member in which a first constituting component and a second constituting component have therebetween a liquid supply path, comprising:

a pair of molds;

a molding unit configured to injection-mold the first constituting component at a first position between a pair of molds and to injection-mold the second constituting component at a second position between the pair of molds;

a moving unit configured to move the pair of molds relative to each other to open the pair of molds so that one of the pair of molds has the first constituting component and the other of the molds has the second constituting component, and to oppose the first constituting component to the second constituting component;

a mold-closing unit configured to close the pair of molds so that the first constituting component is abutted to the second constituting component; and a unit configured to allow molten resin to flow into an abutted part of the first constituting component and the second constituting component, wherein:

at least one of the first and second constituting components includes a reduced thickness portion receiving a pressure in a case where the molten resin is allowed to flow, and the mold-closing unit positions, in a case where the pair of molds are closed, a mold for suppressing deformation at a face of the reduced thickness portion opposite to a face receiving the pressure.

In the third aspect if the present invention, there is provided a liquid supply member, comprising:

a first mold member;

a second mold member;

a liquid supply path configured to supply liquid that is formed between the first mold member and the second mold member;

a resin portion configured to join the first and second mold members that is provided in a vicinity of an abutted part of the first mold member and the second mold member; and a reduced thickness portion of the first mold member that is provided to be abutted to the resin portion, wherein a face of the reduced thickness portion is abutted to the resin portion and a back face opposite to the face is abutted to a space portion.

According to the present invention, first and second constituting components are injection-molded and joined within a pair of molds. Thus, a liquid supply member having a high dimensional accuracy can be manufactured. Furthermore, the first and second constituting components can be joined by molten resin so that a pair of molds is opposed to at least one reduced thickness portion of the first and second constituting components, thereby suppressing the reduced thickness portion from being deformed. This can consequently further improve the dimensional accuracy of the liquid supply members and can secure the shape of a liquid supply path suitable for stable liquid supply.

Further features of the present invention will become apparent from the following description of exemplary embodiments (with reference to the attached drawings).

DESCRIPTION OF THE EMBODIMENTS

Figure 1A:
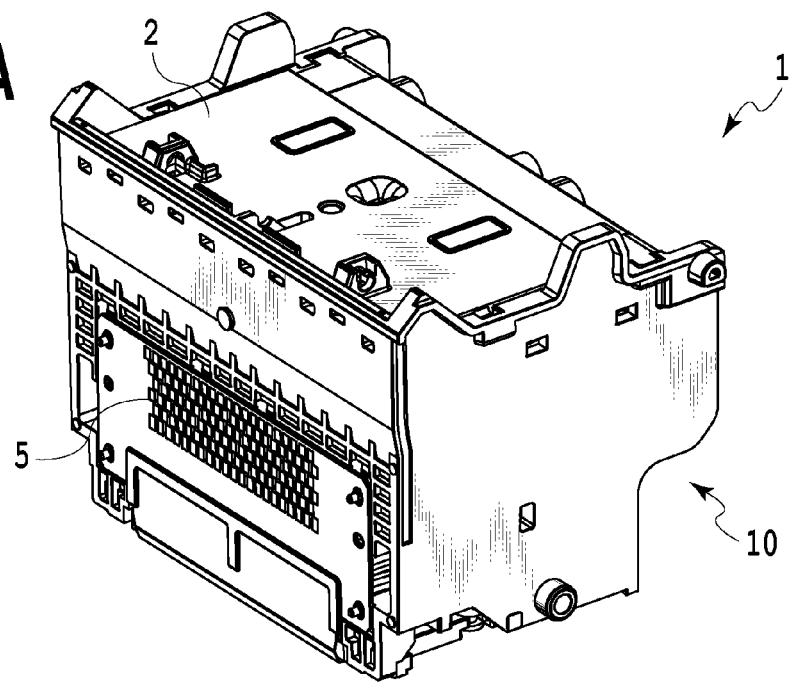
FIG. 1A and FIG. 1B are perspective views illustrating a print heat including an ink supply member of the first embodiment of the present invention, respectively.

First, prior to the description of an embodiment of the present invention, the following section will describe a manufacture method of a hollow structure including therein a hollow portion that can injection-mold and join a plurality of components within a pair of molds (die slide injection molding). The manufacture method as described above is disclosed, for example, in Japanese Patent Laid-Open No. 2002-178538.

In the manufacture method as described above, at dislocated positions within a pair of molds (a fixed-side mold and a movable-side mold), two components constituting the hollow structure (e.g., one is a component having an opening portion and the other is a component covering the opening portion) are injection-molded, respectively (primary molding), and the molds are subsequently opened. During this, one of the two components is allowed to remain in the fixed-side mold and the other is allowed to remain in the movable-side mold. Next, one of these molds is slid so that the one component remains in the fixed-side mold and the other component remains in the movable-side mold are opposed to each other and then these molds are closed. At this point of time, the two components are abutted to each other to form a hollow structure but are not joined. Thereafter, molten resin is allowed to flow to the abutted part (secondary molding) to adhere these components to thereby form the hollow structure.

If a liquid supply member including therein a liquid supply path is manufactured using such a manufacture method, a plurality of components constituting the liquid supply member can be molded and joined within a pair of molds to thereby retain the joint accuracy of the plurality of components approximately within the size of one component. The shape of the liquid supply path in such a liquid supply member for example may cause, after the formation of two components (primary molded pieces) by a primary molding, a part at which the primary molded pieces are not abutted to the mold when the pair of mold is closed for a secondary molding. In such a case, when secondary molding resin (secondary resin) is filled in the molds, there is a risk where the fill pressure of the secondary resin may cause the deformation of the primary molded piece. For example, deformation is easily caused at a position at which the fill pressure of the secondary resin is high such as the vicinity of a gate portion for ejecting secondary resin and a portion of the primary molded piece having a low strength such as a part of the primary molded piece having a thin thickness. Furthermore, a risk is also caused in which, in addition to the deformation of the primary molded piece, the primary molded piece may be broken and the secondary resin may leak from the broken part. For example, when the secondary resin leaks into the liquid supply path, there is a risk where the shape of the liquid supply path suitable for stable liquid supply cannot be maintained. Furthermore, when the primary molded piece is deformed, there is also a risk where the liquid supply member may not have a dimensional accuracy, which causes a piece installed with the liquid supply member to have lower reliability.

The present invention has been made based on the founding as described above.

The following section will describe an embodiment of the present invention with reference to the drawings. A liquid supply member in the following embodiment is an application example as an ink supply member included in an inkjet print head.

First Embodiment

Figure 1B:
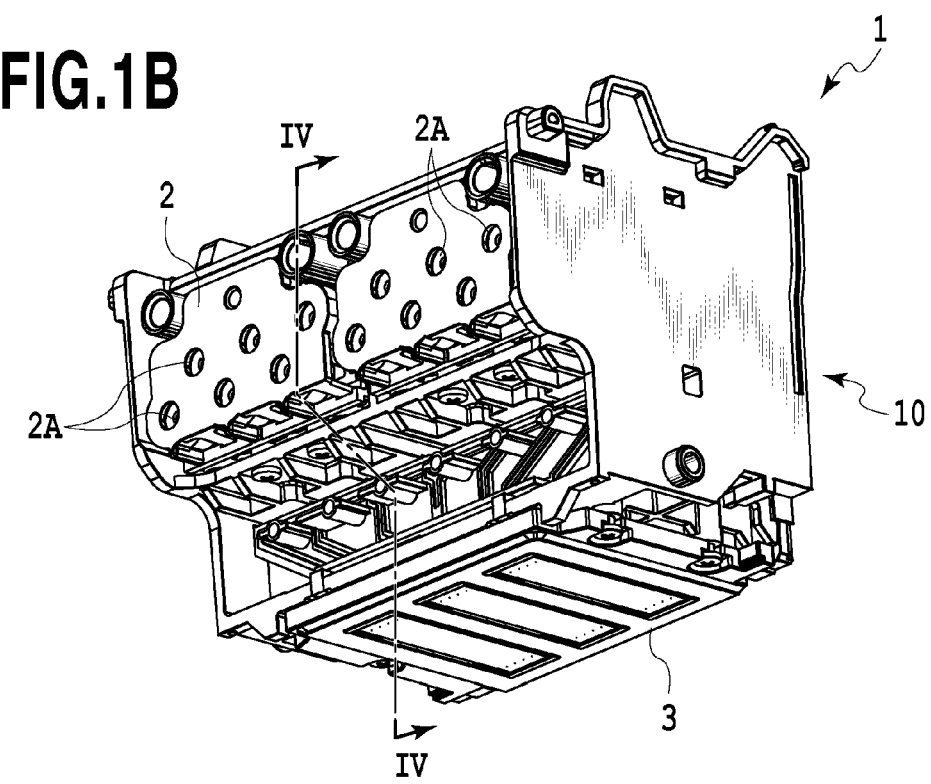

FIG. 1A and FIG. 1B are perspective views illustrating an inkjet print head (liquid ejection head) 1 including an ink supply member (liquid supply member) in this embodiment. The print head 1 of this example is provided in a carriage of a so-called serial scan-type inkjet print apparatus (liquid ejection apparatus). The print head 1 also may be configured so as to be included in a so-called full line-type inkjet print apparatus.

An upper part of the print head 1 has a sub tank 2. An ink (liquid) in a not-shown ink tank (liquid container) is introduced through a not-shown flow path such as a tube into an ink introduction opening (liquid introduction opening) 2A of the sub tank 2. A downwardly-facing face in the print head 1 has a printing element unit 3 that can eject ink. The sub tank 2 and the printing element unit 3 have therebetween an ink supply member (liquid supply member) 10 forming an ink supply path (liquid supply path).

Figure 2:
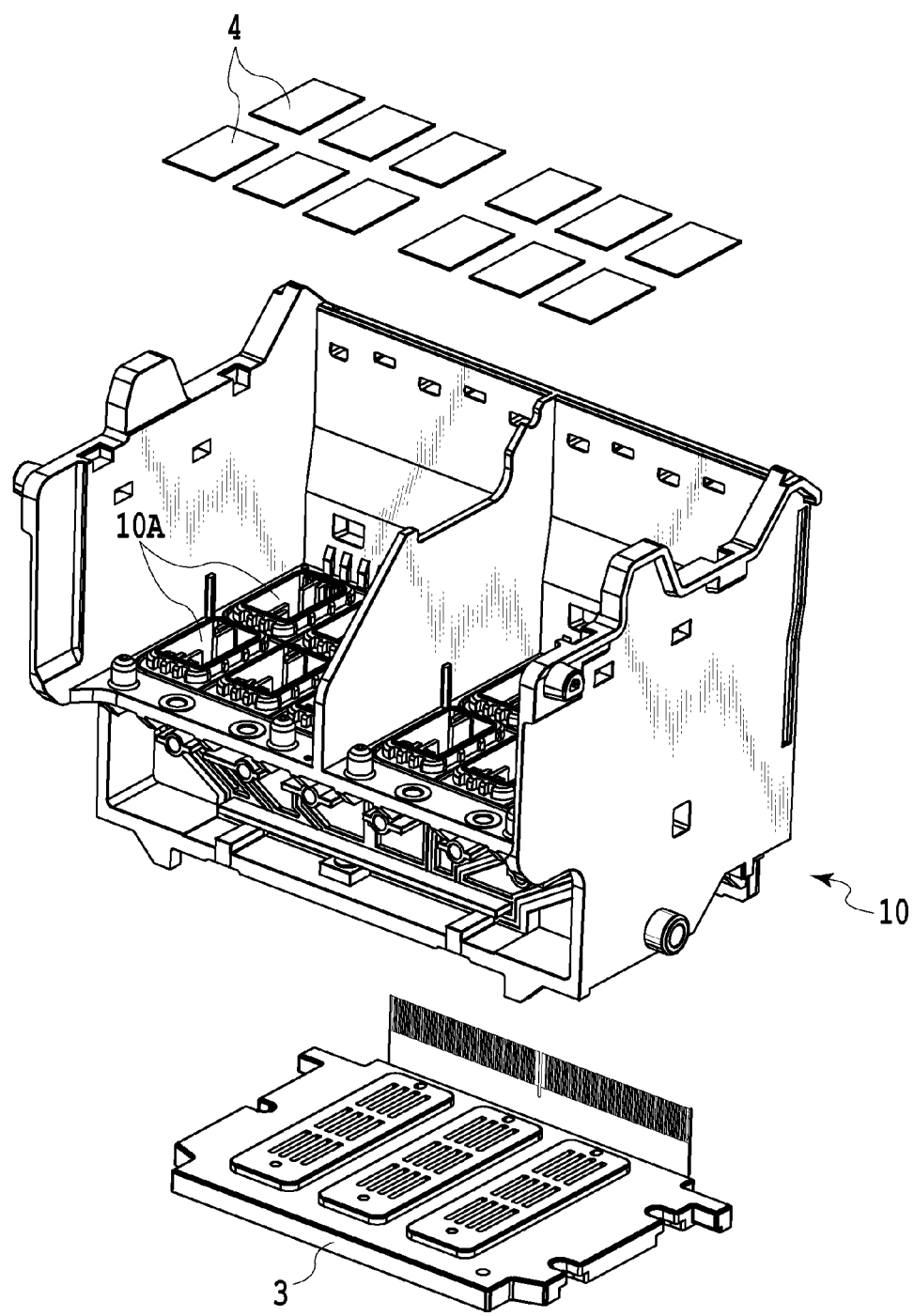
FIG. 2 is an exploded perspective view illustrating the print head of FIG. 1A.
Figure 3:
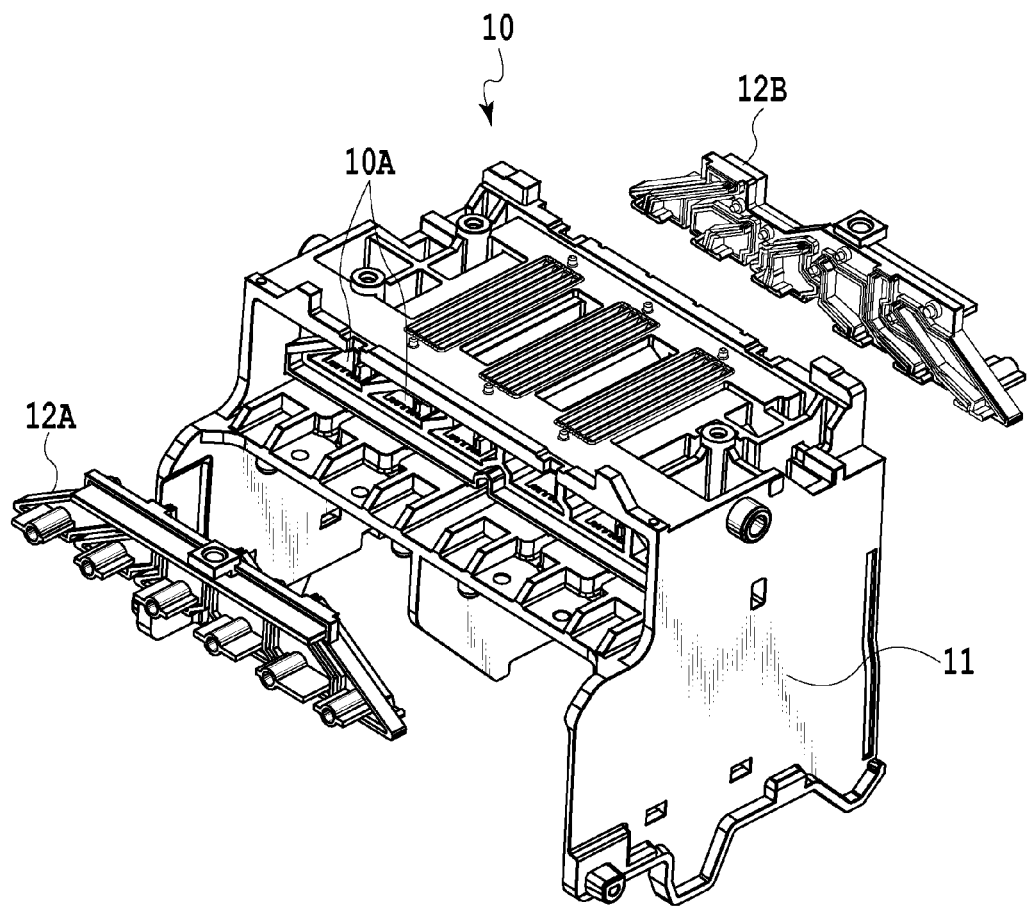
FIG. 3 is an exploded perspective view illustrating of the ink supply member of FIG. 1A.

FIG. 2 is a perspective view illustrating an inner structure of the ink supply member 10. FIG. 3 is an exploded perspective view illustrating the ink supply member 10.

In the ink supply path of the ink supply member 10, at a position of an upstream of a supply direction of the ink connected to the sub tank 2, a filter 4 for removing foreign materials in the ink is provided. In the ink supply path, at a position of a downstream of the ink supply direction of the filter 4, an ink room (liquid chamber) 10A for temporarily storing ink is formed. The ink in the sub tank 2 is introduced by the ink supply path into an ink room 10A through the filter 4 and is subsequently supplied to the printing element unit 3. The printing element unit 3 includes therein a plurality of ejection openings that can eject the ink and that arranged so as to form a not-shown ejection opening array. For each ejection opening, an ejection energy generation element such as an electrothermal transducing element (heater) or a piezo element is provided. In this example, the total of twelve types of inks are supplied to the respective twelve ink introduction openings 2A in the sub tanks 2. These inks are supplied to the printing element unit 3 through ink supply paths corresponding to them and are ejected through ejection opening arrays corresponding to them. Thus, the twelve filters 4 and the twelve ink rooms 10A are provided, respectively. The ink supply path formed in the ink supply member 10 includes a part providing the communication between the total of twelve ink rooms 10A and the ejection opening arrays corresponding to them. The total of twelve ink rooms 10A are arranged at an interval smaller than an interval at which the ejection opening arrays corresponding to them are arranged. Thus, a part of the ink supply path corresponding to them includes the one having a bent shape. A not-shown print apparatus is used to drive the ejection energy generation element through an electric connection substrate 5 (see FIG. 1A) to thereby eject ink through the ejection opening corresponding to them.

The ink supply member 10 is composed of a plurality of constituting components including a housing (first constituting component) 11 and cover members (second constituting components) 12A and 12B. The ink room 10A formed in the housing 11 includes an opening portion in which the filter 4 is provided, an opening portion connected to the printing element unit 3, and a third opening portion different from these two opening portions. The third opening portion is blocked by the cover members 12A and 12B as described later. In a case of this example, among the total of twelve ink rooms 10A, six ink rooms 10A are formed in two arrays, respectively. The six ink rooms 10A in one array have the third opening portions blocked by the cover member 12A. Similarly, the third opening portions in the respective six ink rooms 10A of the other array are blocked by the cover member 12B. These cover members 12A and 12B will be hereinafter referred to as a cover member 12.

Figure 4:
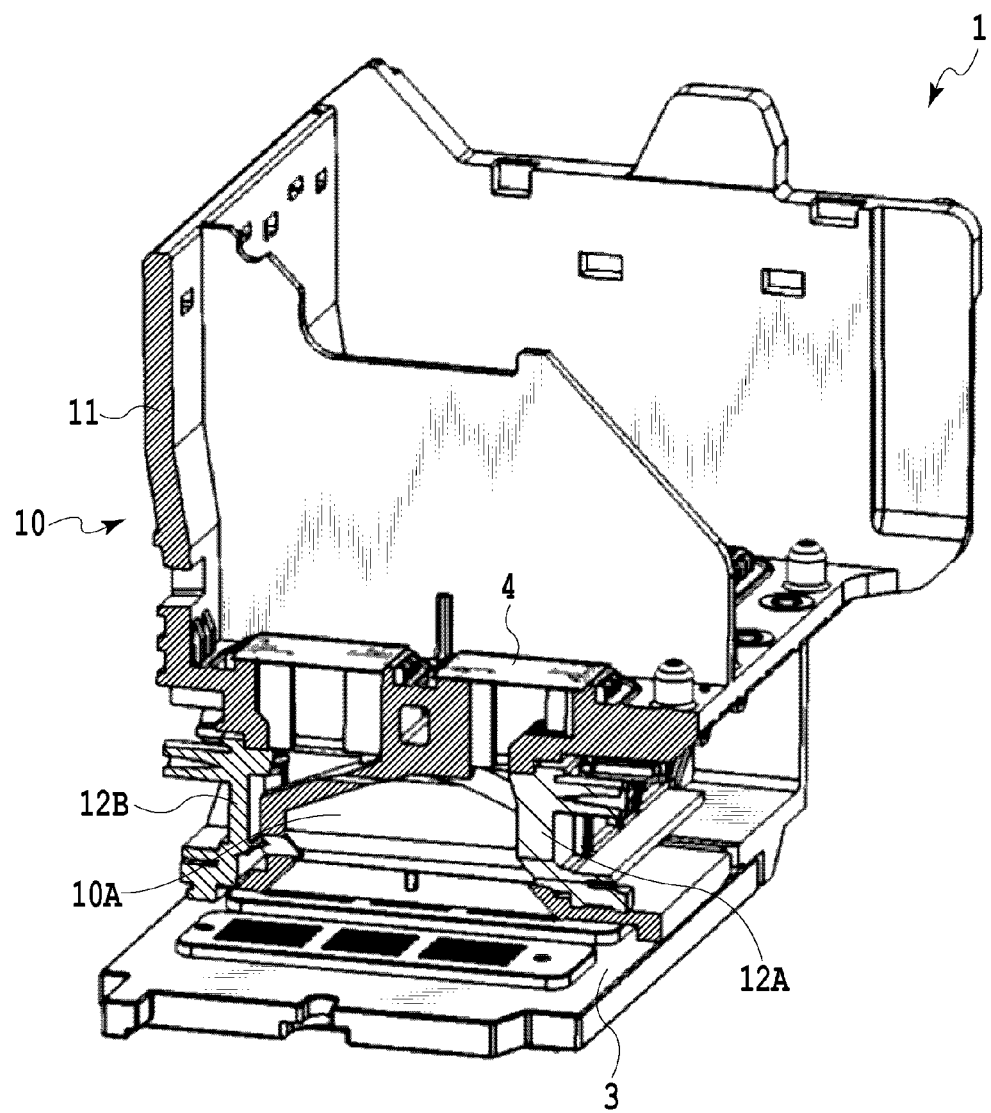
FIG. 4 is a perspective view illustrating the cross section of the print head of FIG. 1A.

FIG. 4 is a cross-sectional view for explaining the ink room 10A formed in the housing 11 of the ink supply member 10 and corresponds to the cross section along the line IV-IV in FIG. 1B. The ink introduced from the sub tank 2 through the filter 4 is temporarily stored in the ink room 10A and is subsequently ejected from the ejection opening of the printing element unit 3. Generally, the ink supply member 10 constituting the ink room 10A is a resin mold piece molded by an injection molding because of the manufacturing easiness, light weight, and corrosion resistance. In a case of this example, the ink room 10A forming the ink supply path is configured so that the filter 4-side opening portion has a shape different from that of the printing element unit 3-side opening portion and an inner face between these two opening portions is formed by a combination of complicate faces. When the housing 11 of the ink supply member 10 is injection-molded so that the ink room 10A as described above is positioned at the interior, the third opening portion different from these two opening portions must be formed in one face of the housing 11. After the housing 11 is injection-molded, the third opening portion is blocked by the cover member 12 (12A, 12B), thereby completing the ink room 10A.

FIG. 5A to FIG. 7B illustrate the order of the basic manufacture method of the ink supply member 10 as described above. These drawings illustrate the order of the one cycle operation of a mold 20 in order to manufacture the ink supply member 10. A fixed-side mold 21 and a movable-side mold 22 constituting the mold 20 of this example includes a first molding position P1 for molding the housing 11 of the ink supply member 10 and a second molding position P2 for molding the cover member 12.

Figure 5A:
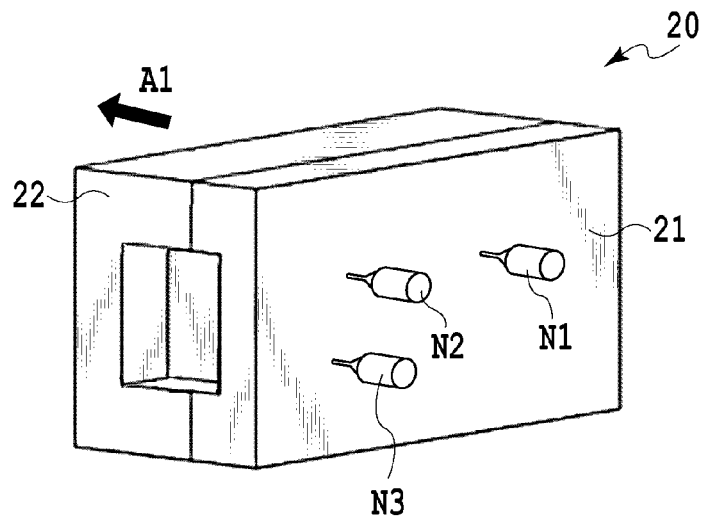
FIG. 5A, FIG. 5B, and FIG. 5C are perspective views illustrating a pair of molds in a manufacture stage of the ink supply member of FIG. 1A, respectively.
Figure 5B:
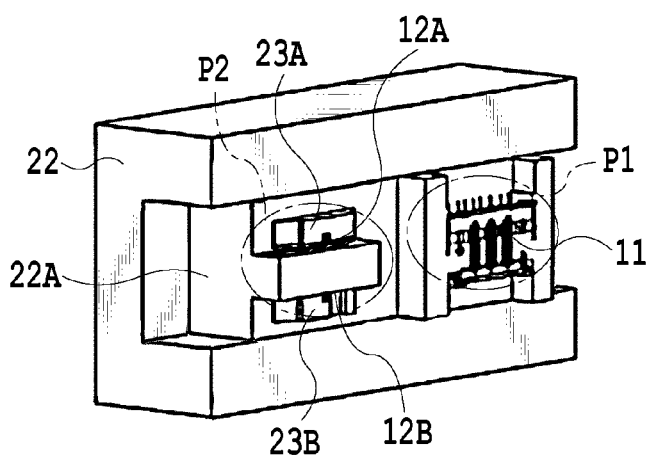
Figure 5C:
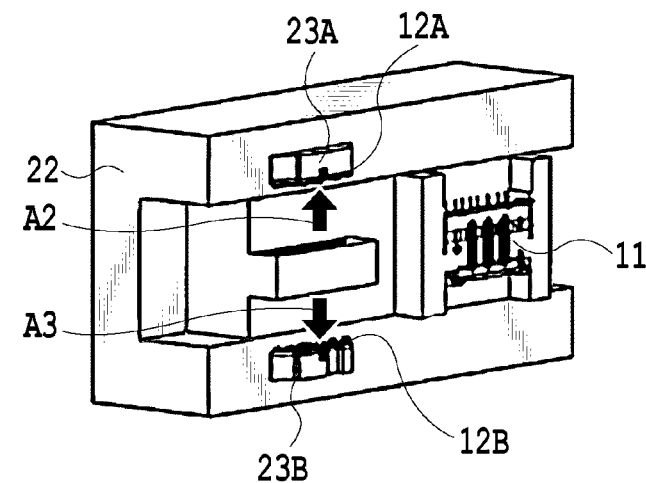

First, as shown in FIG. 5A, after the fixed-side mold 21 and the movable-side mold 22 are mold-clamped, molding resin (primary resin) is allowed to flow between these molds from injection nozzles N1 and N2 through gate portions (primary molding). As a result, the housing 11 of the ink supply member 10 is molded at the first molding position P1 and the cover member 12 is molded at the second molding position P2. Thereafter, the movable-side mold 22 is mold-opened in a direction A1. FIG. 5B illustrates the movable-side mold 22 when the mold 20 is opened as described above. The fixed-side mold 21 is not shown.

In the second molding position P2, the cover member (12A, 12B) is molded by a mold piece 23 (23A, 23B) corresponding to them and a part of the movable-side mold 22 corresponding to them. The cover members 12A and 12B are configured, as shown in FIG. 4, to block the third opening portions of the ink rooms 10A at an inner side of the housing 11. Thus, as shown in FIG. 5B, the cover members 12A and 12B are temporarily withdrawn in directions of arrows A2 and A3 while being retained by the mold pieces 23A and 23B. The mold pieces 23A and 23B are slid by a not-shown part slide mechanism having a driving source (e.g., hydraulic cylinder) separate from an open/close mechanism of the mold 20, thereby being withdrawn in the directions of the arrows A2 and A3.

Figure 6A:
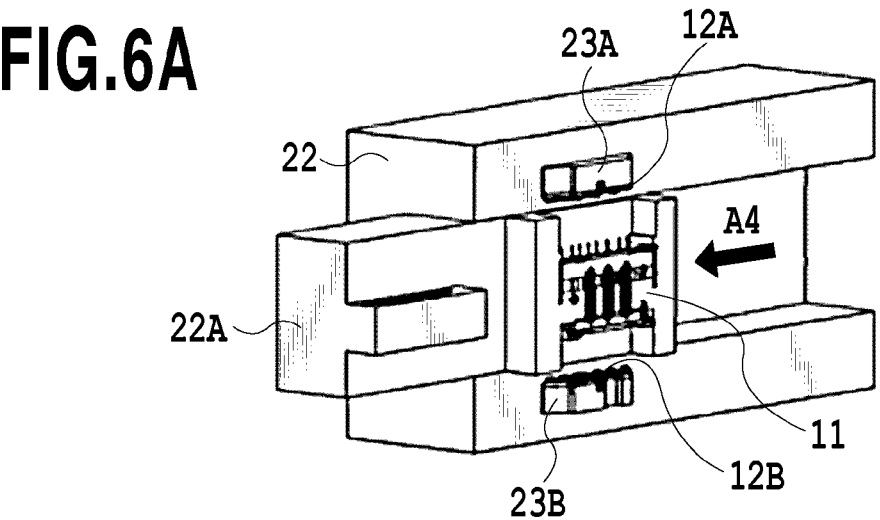
FIG. 6A and FIG. 6B are perspective views illustrating the mold in the manufacture stage of the ink supply member of FIG. 1A, respectively.

Next, as shown in FIG. 6A, after the mold pieces 23A and 23B are withdrawn, the fixed-side mold 21 and the movable-side mold 22 are moved relative to each other. In the case of this example, a die slide mold 22A placed within the movable-side mold 22 is slid in a direction shown by an arrow A4. The housing 11 is retained by the die slide mold 22A and is moved together with the die slide mold 22A so as to be opposed to the cover members 12A and 12B corresponding to the third opening portions of the ink room 10A. The die slide mold 22A is slid, as in the part slide mechanism for the mold pieces 23A and 23B, by a mechanism having a driving source separate from the mold open/close mechanism.

Figure 6B:
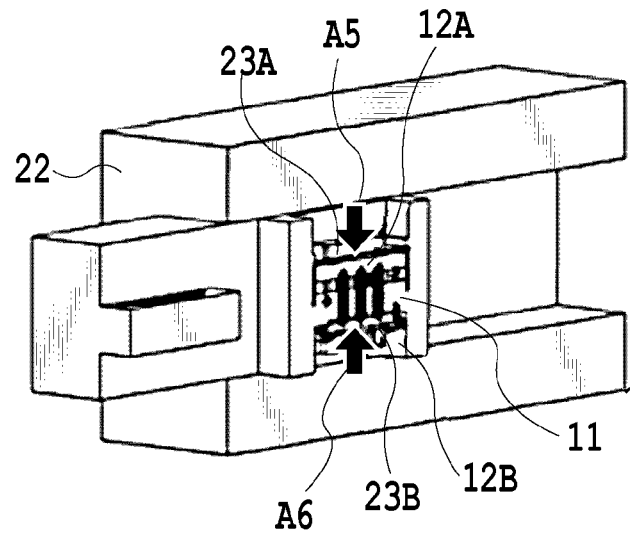

Thereafter, as shown in FIG. 6B, a return operation of the part slide mechanism is used to move the mold pieces 23A and 23B together with the cover members 12A and 12B retained on them in directions shown by arrows A5 and A6. As a result, the cover members 12A and 12B are abutted to the third opening portions of the ink rooms 10A of the housing 11 corresponding to them.

Figure 7A:
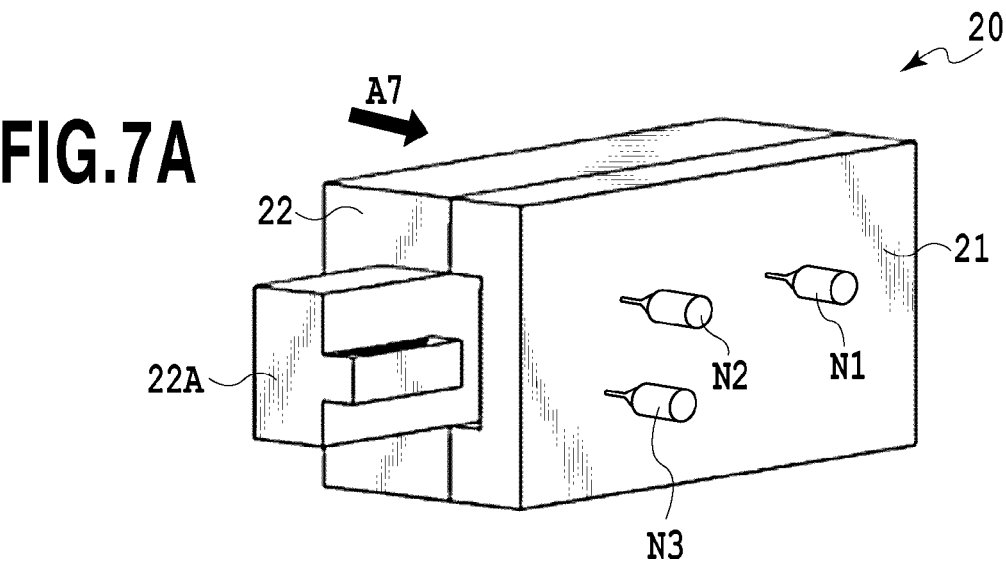
FIG. 7A and FIG. 7B are perspective views illustrating the mold in the manufacture stage of the ink supply member of FIG. 1A, respectively.

As described above, at the second molding position P2 of the mold 20, the third opening portions of the ink rooms 10A of the housing 11 are abutted to the cover members 12A and 12B corresponding to them. Then, in the abutted state as described above, the movable-side mold 22 is moved in a direction shown by an arrow A7 as shown in FIG. 7A and is mold-clamped with the fixed-side mold 21. Thereafter, sealing resin (secondary resin) compatible with the housing 11 and the cover members 12A and 12B is allowed to flow, through an injection nozzle N3, to a part at which the third opening portions of the ink rooms 10A are abutted to the cover members 12A and 12B corresponding to them (secondary molding). The secondary resin is filled without any gap between the third opening portions of the ink rooms 10A and the cover members 12A and 12B corresponding to them and the former and the latter are joined to thereby seal the third opening portions. As a result, the ink room 10A is sealed to exclude the filter 4-side opening portion and the printing element unit 3-side opening portion, thereby completing the hollow ink supply member 10.

Figure 7B:
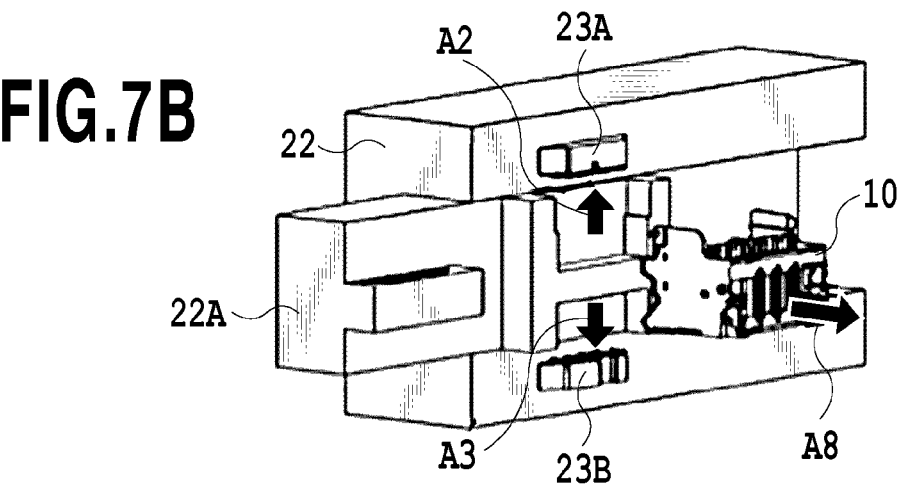

Thereafter, the mold 20 is opened and then the mold pieces 23A and 23B are moved in the directions shown by the arrows A2 and A3 as shown in FIG. 7B. The ink supply member 10 of the completed hollow structure is pushed out in an arrow A8 and is taken out from the mold 20.

Figure 8A:
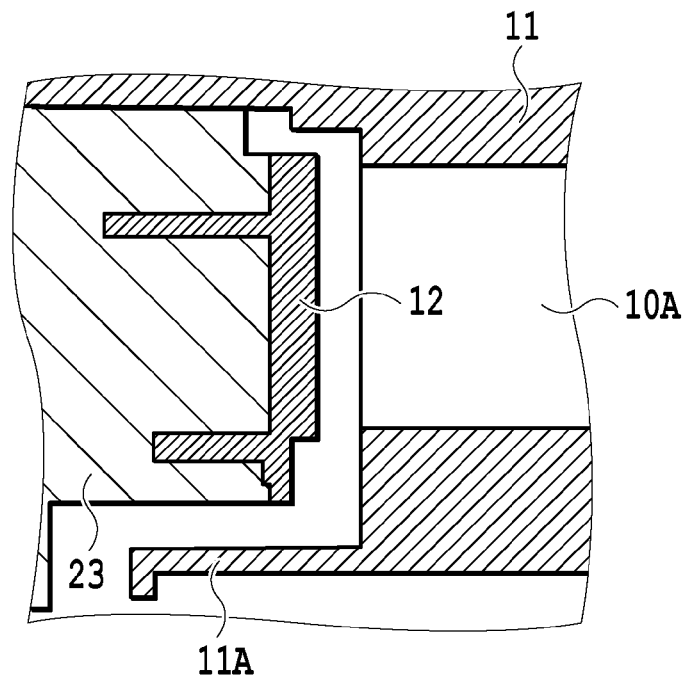
FIG. 8A and FIG. 8B are cross-sectional views illustrating the main part of a manufacture method of an ink supply member as a comparison example, respectively.
Figure 8B:
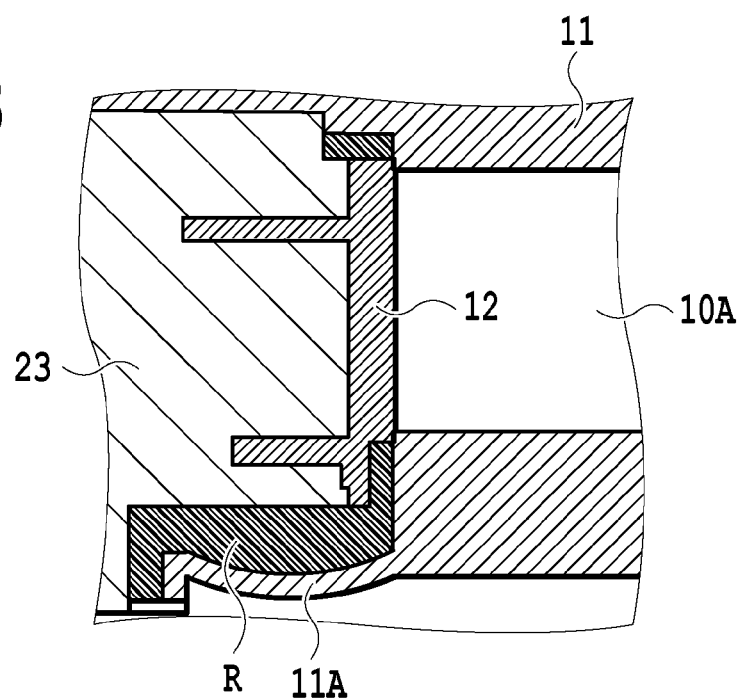

In the basic manufacture method of the ink supply member 10 as described above, the influence by the fill pressure of the secondary resin must be considered. FIG. 8A and FIG. 8B are diagrams to explain the influence by the fill pressure.

FIG. 8A is a cross-sectional view illustrating the main part when the mold piece 23 is slid by the part slide mechanism to allow the cover member 12 to be abutted to the third opening portion of the ink room 10A of the housing 11 as shown in FIG. 6B. FIG. 8B is a cross-sectional view illustrating the main part when a secondary resin (molten resin) R is injected from the gate unit G3 after the cover member 12 is abutted to the third opening portion, as shown in FIG. 7A. The secondary resin R is filled in the space surrounded by the housing 11, the cover member 12, and the mold piece 23. As a result, as described above, the housing 11 is joined with the cover member 12, thereby forming the hollow ink supply member 10.

When the housing 11 is subjected to the primary molding, the fixed-side mold 21 is withdrawn by the operation explained with FIG. 5B. Thus, as shown in a part in FIG. 8B, for example, apart (reduced thickness portion) 11A forming the flow path by the secondary resin R is made without being abutted to the fixed-side mold 21. If the part 11A as described above has a sufficiently-large thickness or has a reinforced structure, no significant deformation is caused even when the fill pressure of the secondary resin R is high. However, in the case as shown in FIG. 8B where the part 11A has a small thickness and a wide region not abutted to the fixed-side mold 21, a deformation of the part 11A due to the fill pressure of the secondary resin R may be caused. The same also applies to a case where a gate having a particularly-high resin pressure is positioned in the vicinity of the part 11A. When such deformation is caused, the part 11A in the ink supply member 10 has a remarkably-deteriorated dimensional accuracy. Furthermore, a part at which the housing 11 is abutted to the cover member 12 is deformed, which cause a risk where the secondary resin R is leaked into the hollow ink room 10A or the part 11A is damaged to cause the secondary resin R to be leaked to the outside.

Figure 9A:
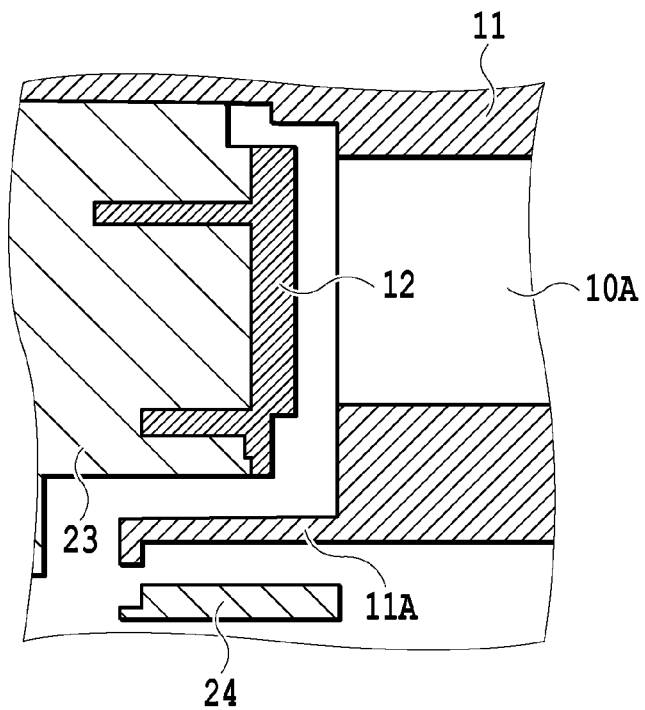
FIG. 9A and FIG. 9B are cross-sectional views illustrating the main part of a manufacture method in the first embodiment of the present invention, respectively.
Figure 9B:
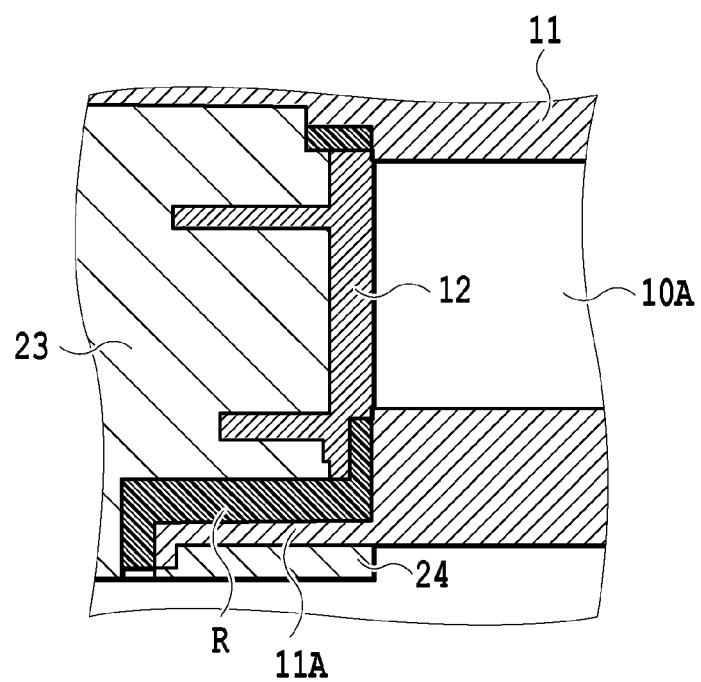

In view of the above, in this embodiment, as shown in FIG. 9A and FIG. 9B, when the mold 20 is mold-closed in the operation described above of FIG. 7A, a mold 24 (mold for suppressing the deformation) is positioned at the part 11A of the housing 11. Specifically, a face of the part 11A of opposite to the face receiving the fill pressure of the secondary resin R is abutted to the mold 24, thus consequently suppressing the deformation of the part 11A due to the fill pressure of the secondary resin R. The mold 24 may be any mold so long as the mold 24 can suppress the deformation by being abutted to the part 11A during the filling of the secondary resin R. For example, the mold 24 may be provided at the second molding position P2 of the fixed-side mold 21 or may be moved by a part slide mechanism. The liquid supply member molded by the manufacture method described above is configured so that one face of the reduced thickness portion is abutted to the secondary resin R (resin portion) and the back face of the one face is abutted to the space portion. The one face of the resin portion R is abutted to the reduced thickness portion and the back face of the one face is separated from the mold piece 23 and thus is abutted to the space portion.

As described above, in this embodiment, in order to suppress the deformation of the primary molded piece (housing 11) due to the fill pressure of secondary resin R, the mold different from the mold for the primary molded piece is abutted to the primary molded piece. However, the invention is not limited to this example. The primary molded piece may be abutted to a mold integrated with the mold for the primary molded piece. Furthermore, two or more components can be molded and joined within one mold to thereby manufacture the liquid supply member (ink supply member) having a high accuracy. Furthermore, the back face of the part of the primary molded piece forming the flow path portion of the secondary resin can be abutted to the mold different from the mold of the primary molded piece to thereby escape, when the secondary resin is cooled after the secondary molding, heat to the mold different from the mold for the primary molded piece via the primary molded piece. As a result, a molding defect such as sink mark also can be suppressed from being caused.

Furthermore, during the filling of the secondary resin R, the part of the primary molded piece whose deformation is suppressed by the mold different from the mold for the primary molded piece is not limited to a part in the vicinity of a gate having a particularly-high resin pressure. The part may be a part of the primary molded piece having a small thickness and a low strength or a part having a wide area receiving the fill pressure of the secondary resin. This embodiment also can be applied, in addition to the ink supply member 10 of the print head, to general mold members constituting an inkjet print apparatus.

Furthermore, by molding the liquid supply member by the die slide injection molding as in this embodiment, the use of adhesive agent is eliminated, thus improving the material selectivity of the liquid supply member on a face having a wetting property. This is particularly preferred to the application to a liquid ejection head typically represented by an inkjet print head for ejecting ink. Furthermore, since the respective components constituting the liquid ejection head are joined by material similar to those of components, the respective components and joint portions (resin portion R) have an equal linear expansion coefficient. Thus, even when the components constituting the liquid ejection head expand or constrict due to a change of the usage environment temperature after the molding for example, the liquid ejection head can be suppressed from being deformed or damaged, which is preferable.

Second Embodiment

Figure 10:
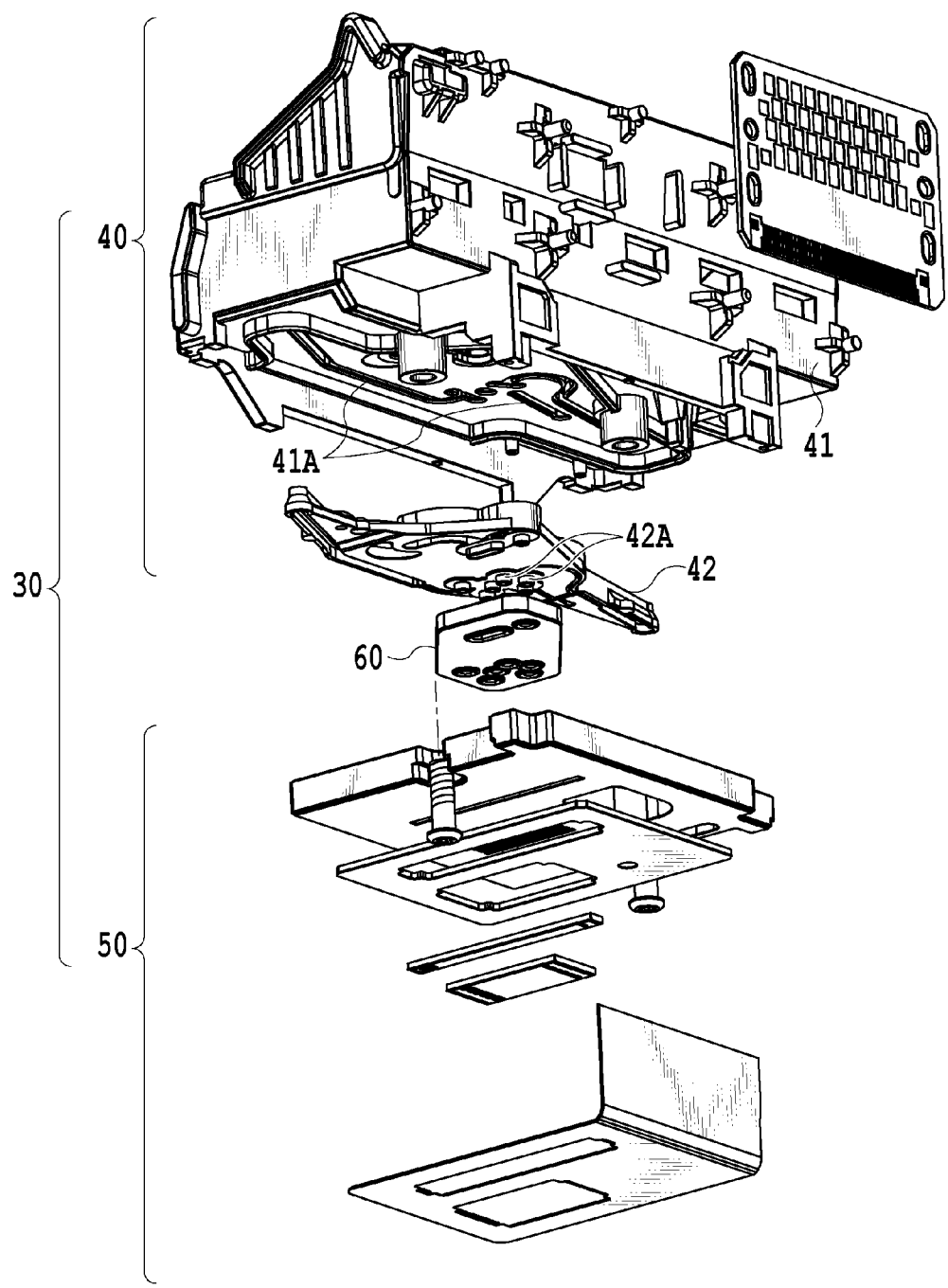
FIG. 10 is an exploded perspective view illustrating the ink supply member of the second embodiment of the present invention.

FIG. 10 is an exploded perspective view for explaining another configuration example of an inkjet print head (liquid ejection head) including an ink supply member (liquid supply member) that can be manufactured by the present invention. An inkjet print head 30 of this example includes an ink supply member 40 as an ink supply unit and a printing element unit 50 as a printing element portion that can eject ink supplied from the ink supply member 40. These ink supply member 40 and printing element unit 50 are connected via an elastic member 36.

Figure 11:
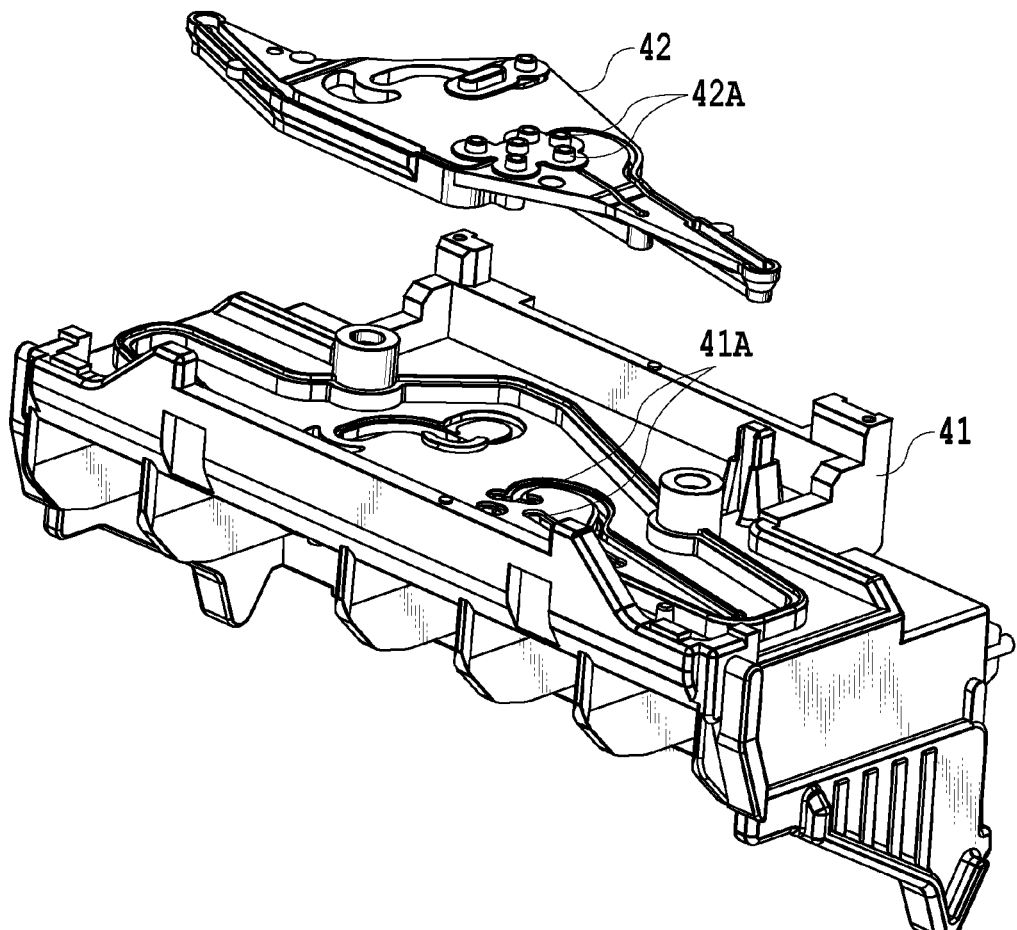
FIG. 11 is an exploded perspective view illustrating the ink supply member of FIG. 10.

FIG. 11 is an exploded perspective view of a main part of the ink supply member 40. A housing 41 and a cover member 42 are used to form an ink supply path to supply the ink in a not-shown ink tank to the printing element unit 50. The housing 41 and the cover member 42 are mold molded pieces. The ink supply member 40 is manufactured in a similar manner as the manufacturing method of the ink supply member 10 in the above-described embodiment. Specifically, at different positions within the pair of molds, the housing 41 and the cover member 42 are molded (primary molding). Thereafter, the die slide operation is used to move the housing 41 and the cover member 42 to a position at which the formed can be abutted to the latter. After the cover member 42 is abutted to the opening portion of the housing 41, the secondary resin is filled (secondary molding). As a result, within the pair of molds, the hollow ink supply member 40 obtained by integrating the housing 41 with the cover member 42 is manufactured. The ink supply member 40 includes therein a plurality of ink supply paths corresponding to the respective plurality of types of inks. In the case of this example, the housing 41 includes groove portions 41A corresponding to the plurality of types of inks. One end of the groove portions 41A has a not-shown opening portion that can be connected to a corresponding ink tank. On the other hand, the cover member 42 includes cover portions corresponding to these groove portions 41A and communication portions 42A communicating with the other end of the groove portions 41A through these cover portions. The communication portion 42A forms an opening portion that can be connected to the printing element unit 50. The housing 41 is joined to the cover member 42 in an integrated manner by the secondary resin, thereby forming an ink flow path by the groove portion 41A and the cover portion covering the opening portion. One end of the ink flow path has an opening portion that is opened at a upper part of FIG. 10 and that can be connected to a not-shown ink tank and the other end has an opening portion that is opened at a lower part of FIG. 10 and that can be connected to the printing element unit 50.

Figure 12A:
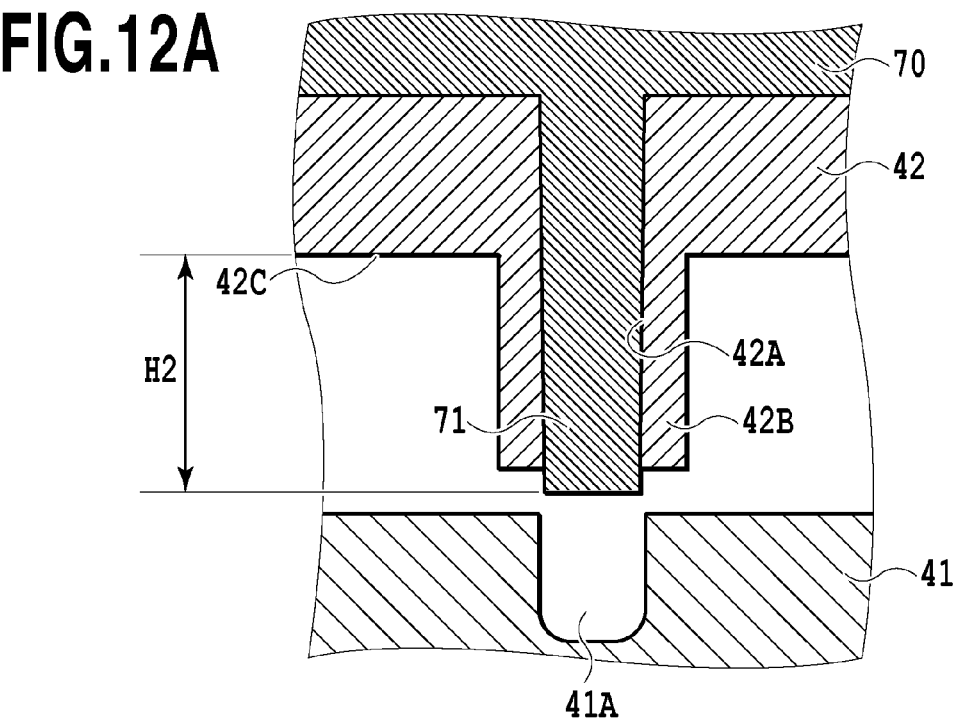
FIG. 12A and FIG. 12B are cross-sectional views illustrating the main part of a manufacture method in the second embodiment of the present invention, respectively.
Figure 12B:
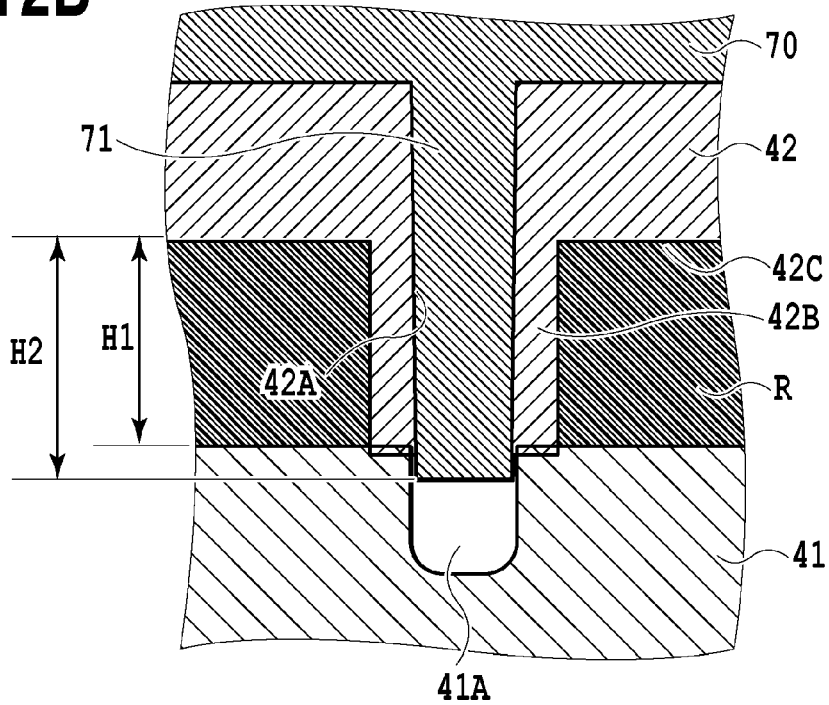

FIG. 12A and FIG. 12B are cross-sectional views illustrating a joint part of the housing 41 and the cover member 42 in a manufacture stage of the ink supply member 40. The cover member 42 is molded using the mold 70 (primary molding) and is subsequently moved to a joint position opposed to the housing by the die slide operation as in the above-described embodiment while being retained by the mold 70. The mold 70 includes, as shown in FIG. 12A, a mold portion 71 for forming the communication portion 42A. The tip end of the mold portion 71 extends, as shown in FIG. 12B, to a position at which the mold portion 71 is inserted to the groove portion 41A. As shown in FIG. 12B, the housing 41 is abutted to the cover member 42 and then the secondary resin R is allowed to flow (secondary molding), thereby manufacturing the ink supply member 40 having a hollow ink supply path. A wall part 42B of the communication portion 42A in the cover member 42 is a part that tends to deform due to the fill pressure of a secondary resin R. When this part 42B deforms, a risk is caused where the ink supply member 40 has a lower dimensional accuracy or the secondary resin R is leaked, which prevents the shape of the ink supply path suitable for the stable ink supply from being secured.

In this embodiment, the part 42B is suppressed by the mold portion 71 from being deformed. Specifically, the mold portion 71 of the cover member 42 during the primary molding is allowed, as shown in FIG. 12B, to be abutted to the cover member 42 also during the secondary molding, thereby suppressing the deformation of the part 42B due to the fill pressure of the secondary resin R. This can consequently improve the dimensional accuracy of the cover member 42 as a primary molded piece and can prevent the leakage of the secondary resin R. In particular, while a tip end of the mold portion 71 is being inserted to an interior of the groove portion 41A of the housing 41, the secondary resin R is allowed to flow to thereby suppress more deformation or movement of the mold portion 71, which is preferable. Furthermore, when assuming that a height of the secondary resin R from a flowage face 42C of the secondary resin R in the cover member 42 is H1 and the distance from the flowage face 42C to the tip end of the mold portion 71 is H2, a relation of H1≤H2 is established. This can consequently suppress, by the mold portion 71, the entire face of the part 42B that tends to deform, thereby more securely suppressing the deformation of the part 42B. This embodiment also can be applied, in addition to the ink supply member of the print head, to general mold members constituting an inkjet print apparatus.

Third Embodiment

Figure 13A:
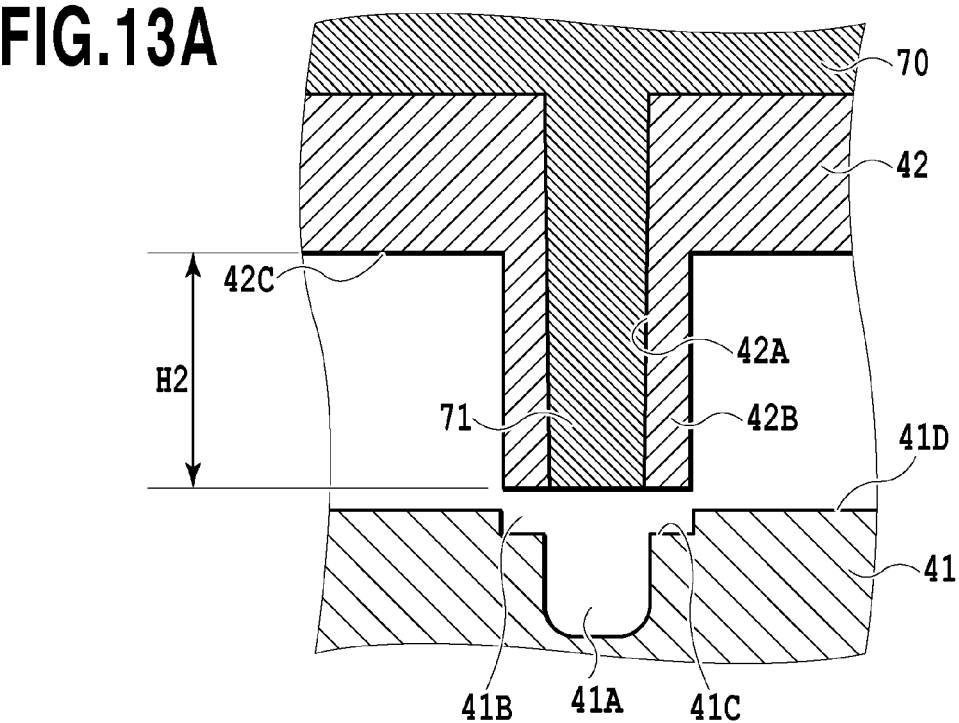
FIG. 13A and FIG. 13B are cross-sectional views illustrating the main part of a manufacture method in the third embodiment of the present invention, respectively.
Figure 13B:
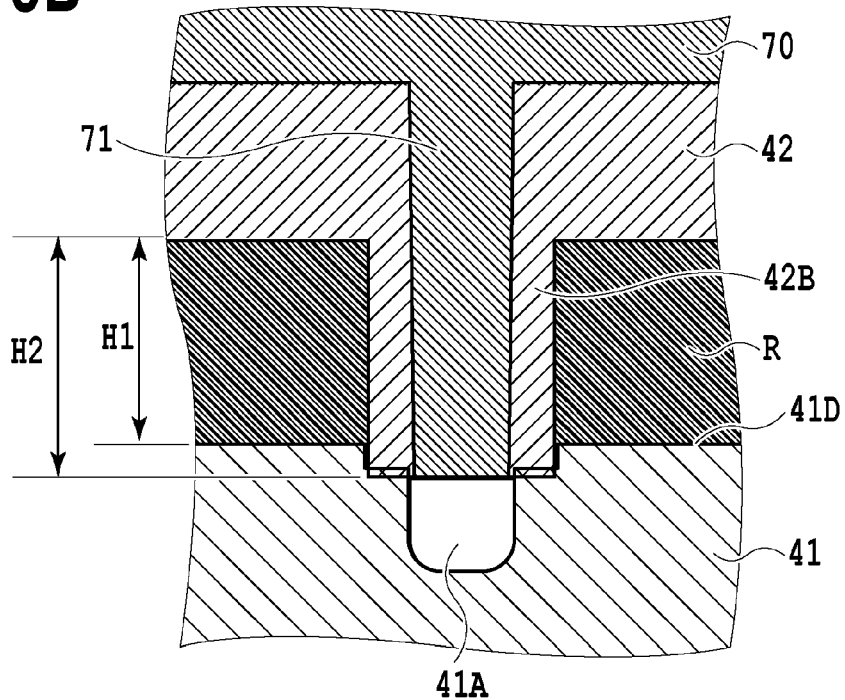

FIG. 13A and FIG. 13B are cross-sectional views for explaining this embodiment. The following section will not describe parts similar to those of the above-described second embodiment.

In this embodiment, the groove portion 41A of the housing 41 is surrounded by a concave portion 41B, thereby causing an uneven part between an abutment part 41C of the housing 41 abutted to the cover member 42 and a flowage face 41D of the secondary resin R on the housing 41. This can consequently prevent the fill pressure of the secondary resin R from being directly applied to a side face of the abutting part (sealed part) of the housing 41 and the cover member 42, thus more securely suppressing the deformation of the part 42B due to the secondary resin R. Furthermore, as in the above-described embodiment, by allowing the height H1 and the distance H2 to have a distance H1≤H2, the entire face of the part 42B that tends to deform can be suppressed by the mold portion 71, thereby more securely suppressing the deformation of the part 42B. This embodiment also can be applied, in addition to the ink supply member of the print head, to general mold members constituting an inkjet print apparatus.

Fourth Embodiment

Figure 14A:
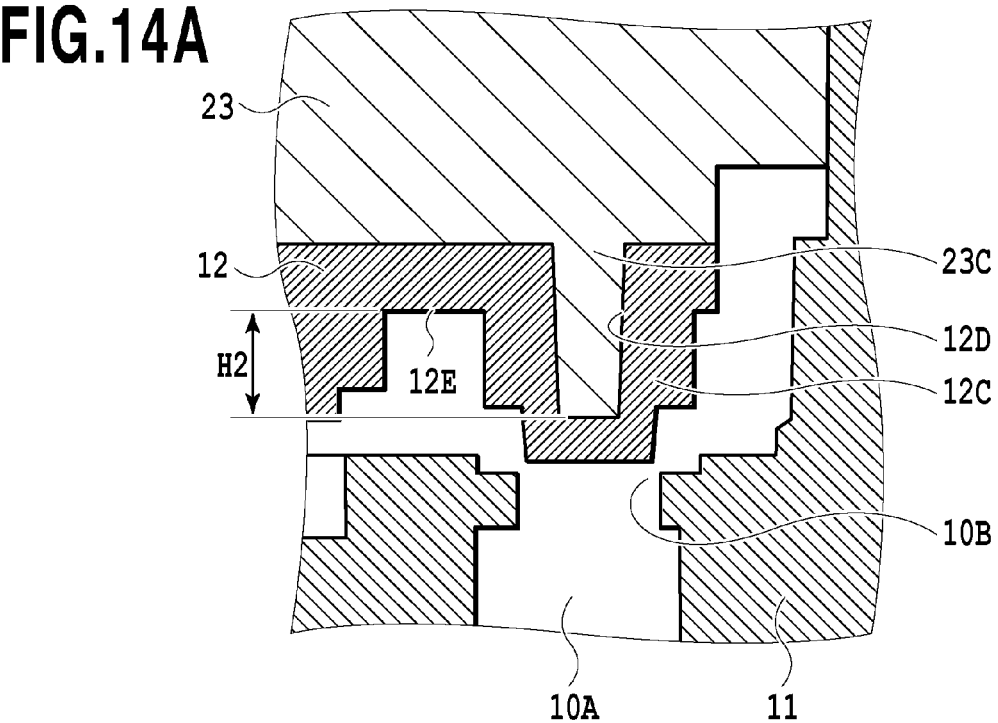
FIG. 14A and FIG. 14B are cross-sectional views illustrating the main part of a manufacture method in the fourth embodiment of the present invention, respectively.
Figure 14B:
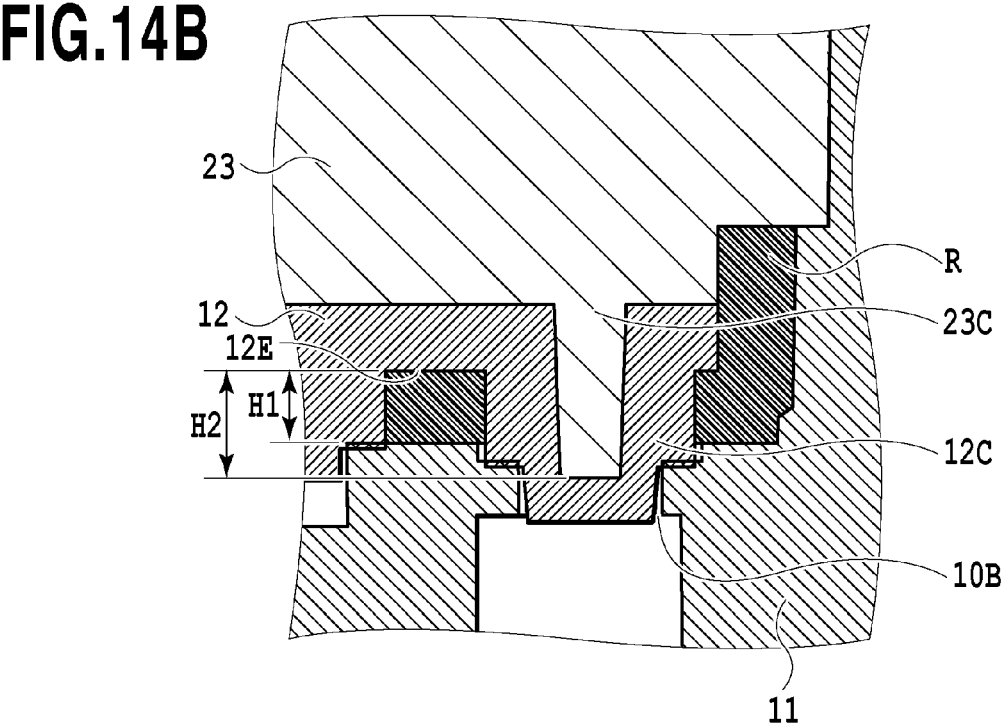

FIG. 14A and FIG. 14B are cross-sectional views of a main part for explaining this embodiment. The following section will not describe parts similar to those of the above-described first embodiment.

FIG. 14A is a cross-sectional view of the main part illustrating the cover member 12 abutted to a third opening portion 10B of the ink room 10A in the housing 11. FIG. 14B is a cross-sectional view of the main part illustrating the secondary resin R is injected after they are abutted to each other. The cover member 12 has a projection portion 12C. This projection portion 12C has a shape similar to that of the opening portion 10B so as to be engaged with the opening portion 10B. The projection portion 12C has, at an inner side thereof, a concave section 12D. The concave section 12D includes therein a mold portion 23C of the mold piece 23. This mold portion 23C can suppress the deformation of the projection portion 12C when the projection portion 12C receives the fill pressure of the secondary resin R.

Furthermore, it is assumed that a height of the secondary resin R from a flowage face 12E of the secondary resin R on the cover member 12 is H1 and a distance from the flowage face 12E to a tip end of the mold portion 23C is H and a relation of H1≤H2 is established. This can consequently retain, by the mold portion 23C, the entire inner face of the projection portion 12C that tends to deform, thereby more securely suppressing the deformation of the projection portion 12C. This embodiment also can be applied, in addition to the ink supply member of the print head, to general mold members constituting an inkjet print apparatus.

Other Embodiments

The reduced thickness portion receiving the pressure of the secondary resin may be provided in any one of the housing and the cover member. A plurality of such reduced thickness portions also may be formed. In this case, a mold for suppressing the deformation may be provided to one of the plurality of reduced thickness portions that particularly tends to deform. For example, a mold for suppressing the deformation may be provided to one of a plurality of reduced thickness portions that has such a face receiving the pressure of the secondary resin that has a predetermined area or more, one having a thickness equal to or lower than a predetermined thickness, or one positioned within a predetermined distance from a gate portion for flowing the secondary resin. There are a plurality of parts (reduced thickness portions) receiving the pressure of the secondary resin. When these reduced thickness portions have different thicknesses, a mold for suppressing the deformation is at least preferably provided to a back face side of a part having the minimum thickness. When there are a plurality of reduced thickness portions having different aeas, a mold for suppressing the deformation is at least preferably provided to a back face side of a part having the maximum area. When there are a plurality of parts (reduced thickness portions) receiving the secondary resin and flowing paths of the secondary resin from a gate portion to positions corresponding to the respective reduced thickness portions are different, a mold for suppressing the deformation is at least preferably provided to a back face side of a reduced thickness portion having the minimum length of the flowing path in which the secondary resin flows.

Furthermore, the present invention is not limited to the ink supply member included in the inkjet print head and may be applied to a liquid supply member in which various liquid supply paths are formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-105174, filed May 25, 2015, No. 2016-061825, filed Mar. 25, 2016, which are hereby incorporated by reference wherein in their entirety.

What is claimed is:

1. A manufacture method of a liquid supply member in which a first constituting component and a second constituting component have therebetween a liquid supply path, comprising:

a first step of injection-molding the first constituting component at a first position between a pair of molds and injection-molding the second constituting component at a second position between the pair of molds;

a second step of opening the pair of molds and subsequently moving the first constituting component and the second constituting component relative to each other so that the first constituting component and the second constituting component are opposed to each other;

a third step of closing the pair of molds so that the first constituting component is abutted to the second constituting component; and a fourth step of allowing a molten resin to flow to a space near an abutted part of the first constituting component and the second constituting component, wherein:

at least one of the first and second constituting components includes a reduced thickness portion having a first face and a second face opposite to the first face, the first face facing the space so as to receive a pressure of the molten resin in the fourth step, the second face facing a space portion inside or outside the liquid supply member after manufacturing, and in a case where the pair of molds are closed by the third step, a mold for suppressing deformation is positioned at the second face of the reduced thickness portion so as to suppress deformation of the reduced thickness portion caused by the pressure received by the first face in the fourth step.

2. The manufacture method of the liquid supply member according to claim 1, wherein the mold for suppressing deformation is a mold different from the pair of molds.

3. The manufacture method of the liquid supply member according to claim 1, wherein the mold for suppressing deformation is a part of the pair of molds.

4. The manufacture method of the liquid supply member according to claim 1, wherein:

a plurality of reduced thickness portions receiving the pressure of the molten resin are formed, and the mold for suppressing deformation is provided at least to the second face of one of the plurality of the reduced thickness portions that receives a highest pressure of the molten resin among the plurality of the reduced thickness portions.

5. The manufacture method of the liquid supply member according to claim 1, wherein:

a plurality of reduced thickness portions receiving the pressure of the molten resin are formed, and the mold for suppressing deformation is provided at least to the second face of one of the plurality of the reduced thickness portions that has a smallest thickness among the plurality of the reduced thickness portions.

6. The manufacture method of the liquid supply member according to claim 1, wherein:

a plurality of reduced thickness portions receiving the pressure of the molten resin are formed, and the mold for suppressing deformation is provided at least to the second face of one of the plurality of the reduced thickness portions that has a shortest flowing path of the molten resin from a gate portion for causing the molten resin to flow to positions corresponding respectively to the plurality of the reduced thickness portions.

7. The manufacture method of the liquid supply member according to claim 1, wherein the mold for suppressing deformation forms a portion combined with a component different from the first and second constituting components.

8. The manufacture method of the liquid supply member according to claim 1, wherein the liquid supply path is a flow path to supply a liquid to a liquid ejection head for ejecting the liquid.

9. The manufacture method of the liquid supply member according to claim 1, wherein a mold part for forming the reduced thickness portion in the first step is different from a part of the mold for suppressing deformation.

10. A manufacture apparatus of a liquid supply member in which a first constituting component and a second constituting component have therebetween a liquid supply path, comprising:
- a pair of molds;
- a molding unit configured to injection-mold the first constituting component at a first position between the pair of molds and to injection-mold the second constituting component at a second position between the pair of molds;
- a moving unit configured to move the pair of molds relative to each other to open the pair of molds and to oppose the first constituting component to the second constituting component;
- a mold-closing unit configured to close the pair of molds so that the first constituting component is abutted to the second constituting component; and
- a unit configured to allow a molten resin to flow into a space near an abutted part of the first constituting component and the second constituting component, wherein:
at least one of the first and second constituting components includes a reduced thickness portion having a first face and a second face opposite to the first face, the first face facing the space so as to receive a pressure in a case where the molten resin is allowed to flow, the second face facing a space portion inside or outside the liquid supply member after manufacturing, and the mold-closing unit positions, in a case where the pair of molds are closed, a mold for suppressing deformation at the second face of the reduced thickness portion so as to suppress deformation of the reduced thickness portion caused by the pressure received by the first face in the case where the molten resin is allowed to flow.

\* \* \* \* \*